United States Patent [19]
Sörensson et al.

[11] Patent Number: 5,344,633
[45] Date of Patent: Sep. 6, 1994

[54] ALKALI METAL SILICATE COMPOSITION WITH POTASSIUM COMPOUND ADDITIVE

[75] Inventors: Olle Sörensson, Lindome; Krister Severinsson, Kungälv, both of Sweden

[73] Assignee: Eka Nobel AB, Sweden

[21] Appl. No.: 75,926

[22] Filed: Jun. 14, 1993

Related U.S. Application Data

[63] Continuation of Ser. No. 679,805, Apr. 3, 1991, abandoned.

[30] Foreign Application Priority Data

Nov. 14, 1990 [SE] Sweden .................. 9003644-3

[51] Int. Cl.$^5$ .................................. C01B 33/32
[52] U.S. Cl. ........................ 423/333; 423/332; 252/135
[58] Field of Search ............. 423/332, 333, 334; 252/135

[56] References Cited

U.S. PATENT DOCUMENTS

| | | | |
|---|---|---|---|
| 2,585,609 | 2/1948 | Wills | 423/333 |
| 2,593,652 | 8/1946 | Blanchard | 423/333 |
| 2,933,371 | 4/1960 | Iler et al. | 423/332 |
| 3,537,815 | 3/1967 | Burke | 423/333 |
| 3,709,837 | 1/1973 | Weldes | 423/333 |
| 3,821,119 | 6/1974 | Temple | 252/135 |
| 3,839,226 | 10/1974 | Yates | 252/454 |
| 3,918,921 | 11/1976 | Pierce | 252/135 |
| 3,931,036 | 1/1976 | Pierce | 252/135 |
| 4,022,704 | 5/1977 | Balfanz et al. | 252/135 |
| 4,578,258 | 3/1986 | Rieck | 423/325 |
| 4,585,642 | 4/1986 | Rieck | 423/333 |
| 4,806,327 | 2/1989 | Rieck et al. | 423/332 |

FOREIGN PATENT DOCUMENTS

| | | | |
|---|---|---|---|
| 685626 | 12/1977 | U.S.S.R. | |
| 922069 | 4/1982 | U.S.S.R. | 423/333 |
| 874117 | 8/1961 | United Kingdom | |
| 1595770 | 8/1981 | United Kingdom | |
| 2099412 | 12/1982 | United Kingdom | |

*Primary Examiner*—Olik Chaudhuri
*Assistant Examiner*—Ken Horton
*Attorney, Agent, or Firm*—Burns, Doane, Swecker & Mathis

[57] ABSTRACT

The invention concerns a solid alkalimetal silicate having a molar ratio $SiO_2:M_2O$ from about 1.5 to about 3, in which M is an alkalimetal substantially consisting of sodium and potassium. The silicate contains from about 1 and up to about 5% by weight of $K_2O$ based on the dry material and the water content being from about 16 to about 25% by weight based on the total weight.

Further, the invention concerns a method of its preparation, its use and a cleaning agent composition containing the silicate above.

7 Claims, No Drawings

ALKALI METAL SILICATE COMPOSITION WITH POTASSIUM COMPOUND ADDITIVE

This application is a continuation of application Ser. No. 07/679,805, filed Apr. 3, 1991, now abandoned.

BACKGROUND OF THE INVENTION

The present invention concerns solid alkali metal silicate comprising sodium and potassium. The silicate also contains from about 1 to about 5% by weight of $K_2O$ and has a water content from about 17 to about 25% by weight. The invention also concerns a method of its preparation, its use and cleaning compositions containing such silicate.

Sodium metasilicate, i.e. sodium silicate having a molar ratio $SiO_2:Na_2O$ of about 1, is frequently used in cleaning products such as washing and dishwasher agents. The silicate inhibits corrosion on glass, glazing and metal parts and also functions as an alkali generating agent. Generally, granules of pentahydrate are used, which granules dissolve quickly in water. However, many products contain metasilicate in such a high amount that a very high alkalinity is obtained, which renders the products corrosive and unpleasant to handle.

Less alkalinity but the same protection against corrosion can be obtained by the use of sodium silicates having a higher molar ratio $SiO_2:Na_2O$, for example disilicates whose molar ratio is about 2. For use in high concentrated cleaning products it is highly desirable that the silicate has as high bulk density as possible. A spray dried powder of disilicate may be brought to granules with suitable size and high bulk density by compacting, which for example is shown in U.S. Pat. No. 3,835,216. However, such compacted disilicates dissolve too slowly in water to be useful in commercial products in practice.

DESCRIPTION OF RELATED ART

From U.S. Pat. No. 3,918,921 alkali metal silicate having a molar ratio $SiO_2:M_2O$ of 3.92 including both sodium and potassium is known, but it has not been compacted. Further, nothing is said whether the bulk density or the solubility are affected by the composition of the silicate.

In U.S. Pat. No. 3,931,036 the possibility of compacting potassium silicate is mentioned, but no such experiments have been performed and there is no indication of what the result would be. Neither is disilicate comprising both sodium and potassium mentioned.

From U.S. Pat. No. 4,022,704 sodium silicate containing additives such as sodium carbonate is known. The preferred content of additives is more than 80% by weight based on the sodium silicate.

SUMMARY OF THE INVENTION

The object of the present invention is to provide a solid alkali metal silicate which dissolves quickly in water and gives less alkalinity than corresponding metasilicate. This has now been found possible as it has appeared that a silicate with a certain water content and containing a small amount of potassium has considerably improved properties compared to previously known silicates.

Thus, the invention concerns a alkali metal silicate according to claim 1. More specifically, it concerns a solid alkali metal silicate having a molar ratio $SiO_2:M_2O$ from about 1.5 to about 3, preferably from about 1.8 to about 2.5, in which M is an alkali metal substantially consisting of sodium and potassium. If the molar ratio is too low the silicate will be too alkaline while the solubility in water decreases at high molar ratios. The silicate contains from about 1, preferably from about 2 and up to about 5, preferably up to about 4% by weight of $K_2O$ based on the dry material, and has a water content from about 16, preferably from about 18, most preferably from about 20 and up to about 25, preferably up to about 22% by weight based on the total weight. The silicate may also contain sodium carbonate, for example from about 7 to about 20, preferably from about 7 to about 15, most preferably from about 8 to about 12% by weight based on the dry material. The dry material refers to $M_2O + SiO_2 + Na_2CO_3$, if present.

DESCRIPTION OF THE PREFERRED EMBODIMENT

It has been found that the rate of dissolution of a pure sodium disilicate increases with the water content up to about 20% by weight. At higher water contents, however, the rate of dissolution is lower, especially if the material is compacted. This is probably due to the fact that a phase transition occurs when the silicate is subjected to pressure. Through the invention it has, however, been found that if the silicate includes small amounts of potassium, the rate of dissolution continues to increase with the water content and becomes considerably higher than the rate achieved for a pure sodium silicate. Since solid silicate generally is prepared by drying an aqueous solution, energy can be saved if the drying does not have to be conducted that far. Moreover, a silicate having high water content generally also has higher bulk density and is easier to granulate. It has also been found that silicate having lower water content dissolves quicker if it contains potassium according to the invention.

The silicate according to the invention can be in the form of a powder, for example with an average particle diameter from about 60 to about 400 μm, as well as in the form of granules, for example with an average particle diameter from about 650 to about 900 μm. In both cases it is preferred that the bulk density exceeds about 800 g/liter, especially that it exceeds about 900 g/liter. Through the invention it has been found possible to provide a less alkaline silicate with such a high bulk density and with retained high rate of dissolution.

The invention also concerns a method of preparing a silicate according to the above description by drying an aqueous solution of an alkali metal silicate to a solid state, suitably a powder, having a water content from about 16 to about 25% by weight, the alkali metal silicate having a molar ratio $SiO_2:M_2O$ from about 1.5 to about 3 in which M is an alkali metal substantially consisting of sodium and potassium, wherein one or more potassium compounds, preferably potassium hydroxide and/or potassium silicate, is added to the solution prior to the drying or to the dry material in an amount so that the product will contain from about 1 to about 5% by weight of $K_2O$ based on the dry material. Also sodium carbonate and/or potassium carbonate may be added to the solution prior to the drying or to the dry material so that the product will contain from about 7 to about 20% by weight sodium carbonate based on the dry material. It is preferred that the aqueous solution prior to the drying has a solid content from about 20 to about 55% by weight, most preferably from about 30 to about 50% by weight. If the desired product is a powder, all components, i.e. $Na_2O$, $SiO_2$, $K_2O$ and optionally $Na_2CO_3$, should be included in the solution with suitable contents relative to each other prior to the drying. This is also preferred if the end product is in form of granules, in which case, however, it is also possible to add potassium hydroxide, potassium silicate or potassium carbonate and optionally sodium carbonate to the powder prior to the granulation, either as solids by dry mixing or by spraying an aqueous solution on the dried silicate powder. Concerning preferred contents and amounts it is referred to the description of the product according to the invention.

The drying is preferably performed in a spray dryer, but also other kinds of dryers may be used, such as fluid-bed dryers, rotating ovens and drum dryers. When spray drying, it has surprisingly been found that a higher bulk density of the powder can be obtained if the aqueous solution prior to the drying contains all components according to the invention.

If the dried powder is to be granulated it may be performed by many different methods, such as compacting, extruding, agglomeration in drum or disk, fluid-bed granulation, prilling or in different kinds of mixers. From these methods compacting is preferred since it is easier to obtain a high bulk density. Most preferred is roll compacting, in which method the dried powder is subjected to high pressure between two rolls rotating in opposite directions, pressed against each other and fed with the powder. The rolls may be provided with pockets to form briquettes. In other cases, bigger units are obtained which can be crushed and screened. At compacting, it is also possible to improve the firmness of the granules by adding a small amount of a binding agent in the form of waterglass solution, for example in an amount of about 1 to about 8, preferably from about 2 to about 5% by weight of waterglass solution based on the total weight, wherein the waterglass solution has a preferred dry content from 0 to about 50, especially from about 30 to about 45% by weight. Thereby the total water content of the product is slightly increased, generally about 1 percentage unit.

An aqueous solution of sodium silicate may be prepared in a well known way by melting quartz sand with sodium carbonate during liberation of carbon dioxide, whereupon the melt is cooled to a solid material which is dissolved in water at increased temperature. Alternatively, quartz sand can be dissolved in a solution of sodium hydroxide at increased pressure and temperature. According to the invention potassium may be added in the form of potassium hydroxide at the dissolution of quartz sand or be added to the solution prior to the drying, for example in the form of potassium hydroxide, potassium silicate or potassium carbonate. Sodium carbonate or potassium carbonate may be dissolved together with quartz sand in sodium hydroxide or be added to the solution prior to the drying.

Further, the invention concerns the use of a silicate according to the above description as a corrosion protecting and/or alkali generating substance at cleaning, such as dishwashing, washing up or washing, preferably in a machine. At use, a silicate according to the invention is dissolved in water to a preferred content from about 0.1 to about 4 grams/liter, most preferably from about 0.5 to about 2 grams/liter, preferably together with other active substances such as surfactants, other alkali generating agents, bleaching agents or enzymes.

Finally, the invention concerns a cleaning agent composition, preferably in the form of a powder or granules, such as dishwasher, washing-up or washing agents, especially agents for dishwashing or washing in machines, particularly high concentrated dishwasher or washing agents having high bulk density. The composition contains at least one alkali metal silicate according to the invention, preferably in an amount from about 1 to about 40% by weight, most preferably from about 5 to about 40% by weight, and a filler and/or one or more other substances active at cleaning, for example surfactants, other alkali generating agents, bleaching agents or enzymes. A spray dried powder as well as a granulated or compacted silicate may advantageously be used as a raw material for preparing a cleaning agent according to the invention. If a powder is used, the cleaning agent may for example be prepared by cogranulation with the other components. If a granulated silicate is used, the cleaning agent may for example be prepared by dry mixing with granules or the like of the other components.

A dishwasher composition may, in addition to a silicate according to the invention, contain other alkali generating agents such as sodium carbonate, metasilicate or water glass, complex binding agents such as STP (sodium tripolyphosphate) or other phosphates, citrate, polyacrylate or zeolite. Further, it may contain bleaching agents such as chloroisocyanurate or hydrogen peroxide generating substances, for example perborate or percarbonate, optionally in combination with TAED (tetra acetyl ethylenediamine) or other bleach activators. Moreover, it may contain surfactants, preferably low-foaming nonionic, for example available under the trade name Berol 776 ®, enzymes, clay and fillers such as sodium sulphate. A useful dishwasher agent may have the following composition in % by weight up to 100%:

| silicate according to the invention | 10-40 |
|---|---|
| other alkali generating agents | 0-30 |
| complex binders | 10-35 |
| bleaching agents | 1-15 |
| surfactants | 1-5 |
| enzymes | 0-3 |
| fillers | 0-40 |

A washing agent composition according to the invention contains surfactants, preferably anionic and/or nonionic and/or soaps. The anionic surfactants may for example include linear alkylbenzenesulfonates, secondary alkanesulfonate, alcohol-ethoxysulfonate or alpha-olefinsulfonate, the nonionic surfactants may for example include alkoxylated compounds such as fatty alcohols, alkylphenols or alkylamines, while the soaps for example may include sodium or potassium salts of tallow. Moreover, the compositions may contain well known components, for example builders such as phosphates, polyacrylates or zeolites, fillers such as sodium sulfate, alkali generating agents such as carbonates, bleaching agents such as perborate or percarbonate, bleaching activators such as TAED or TAGU (tetra acetyl glucolurile), complex binders such as EDTA (ethylene diamine tetraacetic acid), NTA (nitrilo triacetic acid), dipicolinic acid or phosphonates, enzymes, foam regulators, perfumes, coloring agents and optical brighteners. A useful washing agent may have the following composition in % by weight up to 100%:

| | |
|---|---|
| silicate according to the invention | 5–15 |
| other alkali generating agents | 5–20 |
| bleaching agents | 0–25 |
| anionic surfactants | 5–20 |
| nonionic surfactants | 2–11 |
| soaps | 0.1–4 |
| complex binders | 0–1 |
| builders | 5–30 |
| fillers | 0–40 |

The invention is now illustrated through some examples. However, the invention is not limited by these, but only by the claims. In the examples, if not otherwise stated, all contents of sodium carbonate and $K_2O$ are given in % by weight based on the total dry material, while water contents are given in % by weight based on the total weight.

EXAMPLE: Spray dried disilicates of different compositions all having a molar ratio $SiO_2:(Na_2O+K_2O)$ of 2 were tested concerning the rate of dissolution according to ISO 3123–1976 (E). For the purpose of simulating compacted material in laboratory scale, the spray dried powder was pressed to tablets at a pressure of 10 tonnes, each one having a weight of 0.5 gram, a diameter of 13.0 mm and a thickness of 1.9 mm. The time for dissolution of each material of a certain composition was measured by putting six tablets in one liter water having a temperature of 25° C. and agitated with a propeller at 600 revolutions/min. The time was measured from the addition of the tablets until the electrical conductivity of the solution was constant. Five different compositions of the dry substance were tested: D=a pure sodium disilicate without additives; D+K2=sodium/potassium disilicate with 1.95% $K_2O$; D+K4=sodium/potassium disilicate with 5.0% $K_2O$; D+K+S=sodium/potassium disilicate with 3.6% $K_2O$ and 10.2% sodium carbonate. The time for dissolution of the above silicates having different water contents appear in seconds in the table below:

| Composition | water content (%) | time for dissolution (s) |
|---|---|---|
| D | 16.6 | 808 |
| D | 19.7 | 543 |
| D | 21.1 | 595 |
| D + K2 | 19.0 | 520 |
| D + K2 | 20.7 | 516 |
| D + K4 | 17.0 | 590 |
| D + K4 | 18.4 | 512 |
| D + K4 | 19.6 | 475 |
| D + K5 | 16.9 | 570 |
| D + K5 | 19.3 | 454 |

-continued

| Composition | water content (%) | time for dissolution (s) |
|---|---|---|
| D + K5 | 20.2 | 450 |
| D + K + S | 16.8 | 480 |
| D + K + S | 18.5 | 470 |

The experiments show that a small amount of potassium increases the rate of dissolution considerably, especially at low water contents.

We claim:

1. Solid alkali metal silicate having a molar ratio $SiO_2:M_2O$ from about 1.5 to about 3, in which M is an alkali metal comprising sodium and potassium, the silicate containing from about 1 and up to about 5% by weight of $K_2O$ based on the dry material and the water content being from about 16 to about 25% by weight based on the total weight.

2. Alkali metal silicate as claimed in claim 1, wherein it has a bulk density exceeding about 800 g/l.

3. A method of preparing a silicate according to claim 1, the method comprising the steps:
    (a) drying an aqueous solution of an alkali metal silicate to a solid state having a water content from about 16 to about 25% by weight, the alkali metal silicate having a molar ratio $SiO_2:M_2O$ from about 1.5 to about 3 in which M is an alkali metal comprising sodium and potassium;
    (b) adding one or more potassium compounds to the solution prior to the drying or to the dry material in an amount so that the product will contain from about 1 to about 5% by weight of $K_2O$ based on the dry material.

4. A method as claimed in claim 3, wherein potassium carbonate, potassium hydroxide or potassium silicate is added prior to the drying.

5. A method as claimed in claim 3, wherein the drying is performed in a spray dryer.

6. A method of preparing a silicate according claim 2, the method comprising the steps:
    (a) drying an aqueous solution of an alkali metal silicate to a solid state having a water content from about 16 to about 25% by weight, the alkali metal silicate having a molar ratio $SiO_2:M_2O$ from about 1.5 to about 3 in which M is an alkali metal comprising sodium and potassium;
    (b) adding one or more potassium compounds to the solution prior to the drying or to the dry material in an amount so that the product will contain from about 1 to about 5% by weight of $K_2O$ based on the dry material.

7. A method as claimed in claim 4, wherein the drying is performed in a spray dryer.

* * * * *